Patented Jan. 16, 1923.

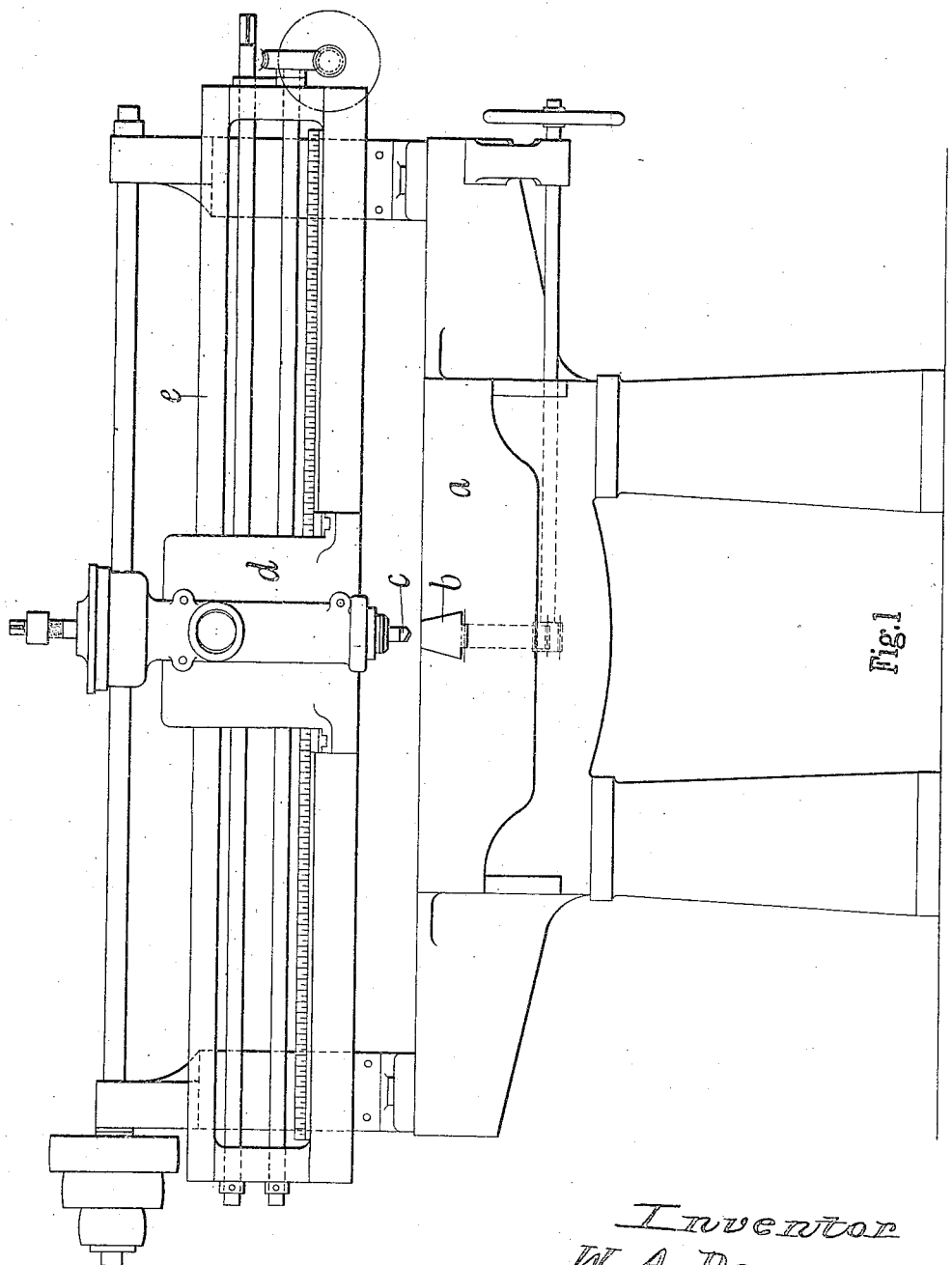

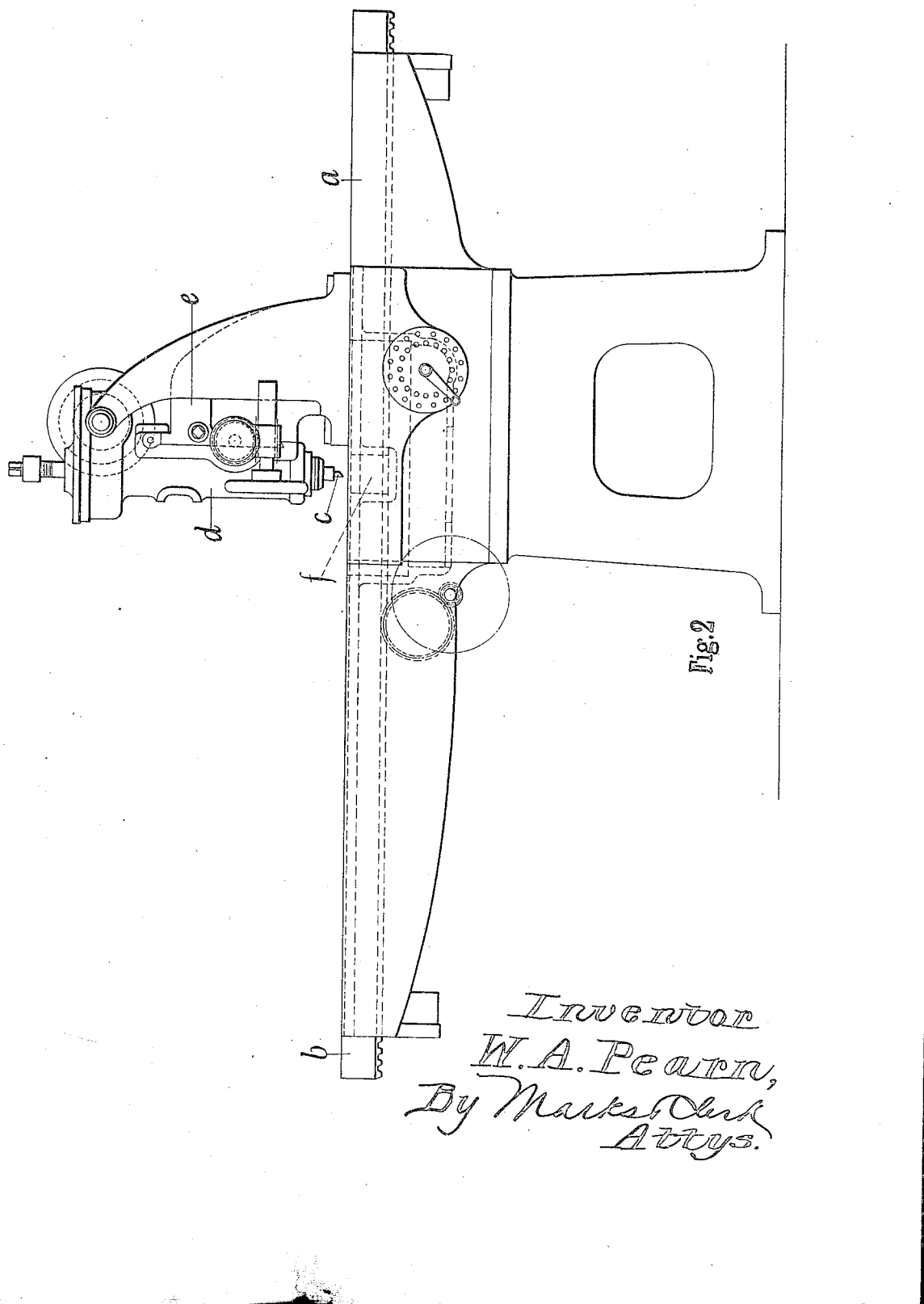

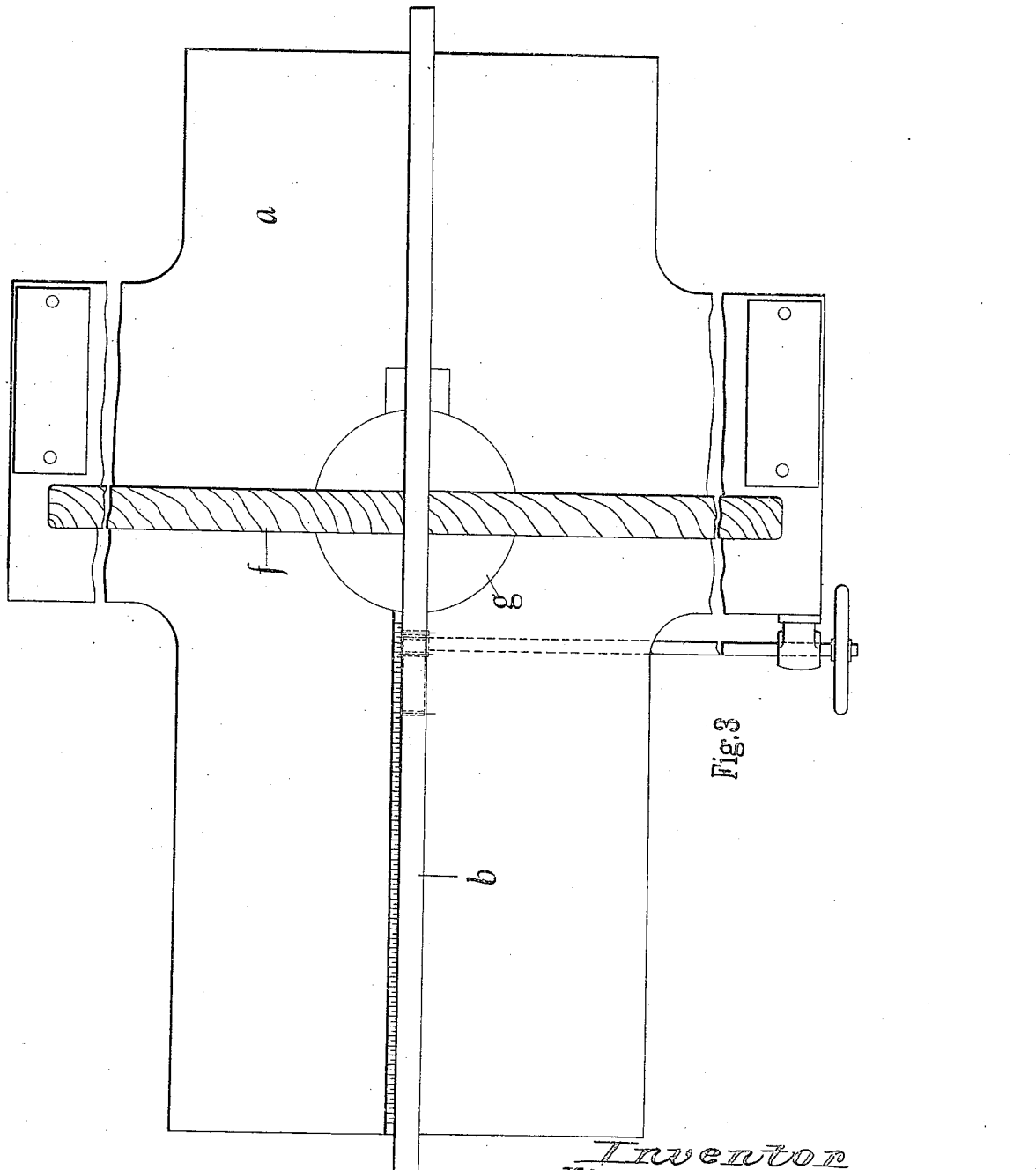

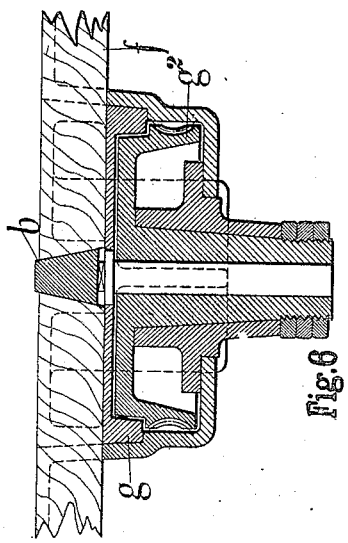
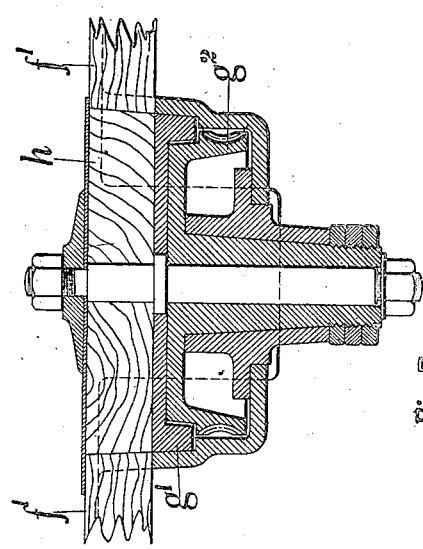
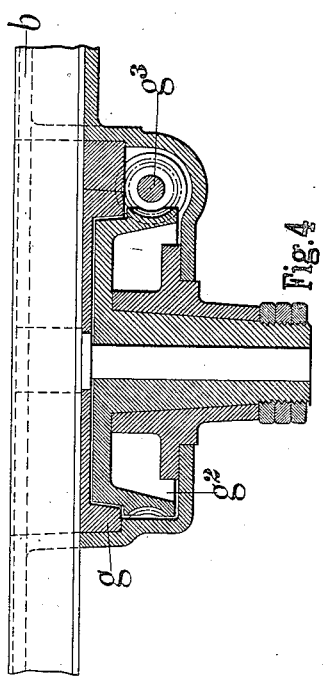
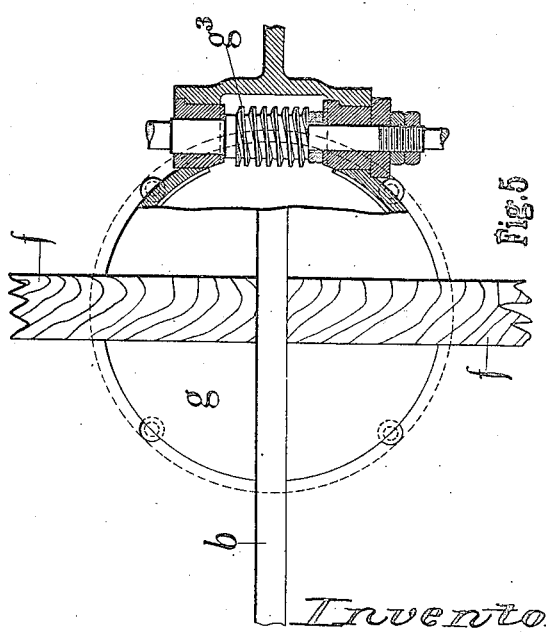

1,442,538

UNITED STATES PATENT OFFICE.

WILLIAM ALFRED PEARN, OF RUSHOLME, MANCHESTER, ENGLAND.

MACHINE TOOL FOR DRILLING OR CUTTING OUT TEMPLATES.

Application filed June 14, 1921. Serial No. 477,587.

(GRANTED UNDER THE PROVISIONS OF THE ACT OF MARCH 3, 1921, 41 STAT. L., 1313.)

*To all whom it may concern:*

Be it known that I, WILLIAM ALFRED PEARN, a subject of the King of Great Britain and Ireland, and resident of Kelsie, Birchfields Road, Rusholme, Manchester, England, have invented certain new and useful Improvements in Machine Tools for Drilling or Cutting Out Templates (which has been patented to me in England, No. 140,562, dated Feb. 21, 1919), of which the following is a specification.

This invention has for its object to provide a new or improved machine tool whereby templates can be produced in a ready and economical manner so as to permit of their use where at present the cost of production prohibits such a course.

The invention comprises the combination with a tool carrying saddle adapted to be traversed across the machine, of a narrow bar to which the template being produced is adapted to be secured, and which is traversable at right angles to the direction of motion of the tool carrying saddle, and a removable hard, but readily penetrable material disposed in the path of the cutting tool so as to support the template at the part where it is being operated upon and to be penetrated by the said tool after it passes through the template.

The invention further comprises the provision of a rotating template carrier with means for its hand or power rotation.

My invention further comprises the details of construction hereinafter described.

Referring to the accompanying sheets of explanatory drawings:—

Figure 1 is an end elevation, Figure 2 a front elevation and Figure 3 a plan view with the tool carrying saddle and slide removed, showing the template producing machine constructed in one convenient form in accordance with my invention.

Figure 4 is a part sectional elevation, Figure 5 a plan view, partly in section, and Figure 6 a sectional elevation taken at right angles to Figure 4 showing the central circular table. In these views the machine is set to produce ordinary and not circular templates.

Figure 7 is a sectional elevation similar to Figure 6 but with the parts arranged for the production of circular templates.

The same reference letters in the different views indicate the same parts.

The machine comprises a table $a$ in which is reciprocated a narrow bar $b$ forming the template carrier. The said bar is preferably of the minimum width necessary for rigidity and to afford support for the template which is secured thereto by screwed studs or like holding down means.

The drilling or like tool $c$ with its saddle $d$ are carried by a cross slide $e$ and traversed thereon and rotated in any ordinary manner, the tool saddle having a vernier reading on to a scale on the slide $e$ by which the exact position of the tool point can be determined. There are also a vernier and scale upon the narrow bar and table so that the position of the holes to be drilled can be quickly located.

Across the machine there are two bars of wood $f$, one at each side of the narrow bar $b$, the said bars $f$ being placed in slots or troughs formed in the machine table in the path traversed by the drilling or like tool $c$, across the machine. The said bars serve to support the template whilst drilling or like operations are taking place and when the tool penetrates the bar, the chips force up the template. The bars are preferably at a slightly higher level than the remainder of the machine table $a$. The bars can be turned when one side has been completely used.

The narrow bar $b$ and the tool saddle $d$ may be traversed by hand or by power, the former preferably by a rack and pinion and the latter by worm and worm wheel. The narrow bar may be positioned slightly to one side of the centre of the machine, the object being to place the said bar at a point where there is the least likelihood of holes being required in a template, if the maximum size receivable by the machine is being dealt with. The narrow bar can usually be so placed relatively to the template that all the holes required can be drilled at one setting without fouling the said bar.

In the centre of the machine table, a circular well is formed which receives the table like part $g$. The said table is slotted to receive the ends of the wood bars $f$ whilst the narrow bar $b$ passes through the table.
If holes in a circular path are to be produced, or if circular pieces such as packing rings or the like are to be cut, the narrow bar is run out of the machine, the long wooden bars $f$ withdrawn and the slotted table $g$ removed. A plain or unslotted table $g^1$ is inserted into position in place of the table $g$ and a wooden support or disc $h$ with the template or the like thereon is bolted down on to the table $g^1$ as shown in Figure 7. Short bars $f^1$ take the place of the bars $f$ previously removed. The table $g^1$ is rotated by the worm wheel $g^2$ actuated by a worm $g^3$, the shaft of which carries a suitable dividing arrangement (not shown) for reading off the angular distances in which the table $g^1$ is moved so that holes at the desired distances apart can be readily produced. Or if packing rings of circular shape are to be cut, the tool saddle $d$ may carry a knife or the like and the packing material supported on the table $g^1$ be rotated there-against by power.

The facility with which templates can be produced by my machine will render their use possible for work where only a few of the same pattern are being made, so obviating the expense and relays due to the present marking out methods.

Having now described my invention what I claim as new and desire to secure by Letters Patent is:—

1. A machine tool for producing templates, comprising a template supporting table, a cutting tool carrier, means supporting said carrier for movement across the table, and a template adjusting member adapted to have a template secured thereto, said adjusting member being of less width than the table and slidable thereon in a direction at right angles to the direction of movement of the cutting tool carrier and the major portion of the template being supported upon the table.

2. A machine tool for producing templates comprising a table, a cutting tool carrier, means supporting said carrier for movement across the table, and a relatively narrow template adjusting member adapted to have a template secured thereto, said adjusting member being movable on the table in a direction at right angles to the direction of movement of the cutting tool carrier and the portions of the template lying laterally of said member being supported upon the table.

3. A machine for producing templates comprising a table, a cutting tool carrier, means supporting said carrier for movement across the table, a template adjusting member adapted to have a template secured thereto, said adjusting members being movable on the template support in a direction at right angles to the direction of movement of the cutting tool carrier, and means arranged in the plane of movement of the cutting tool carrier permitting the cutting tool to penetrate the template and adapted to underlie the portions of the template lying laterally of the adjusting member and below the path of movement of the tool carrier.

4. A machine tool for producing templates comprising a table, a cutting tool carrier, means supporting said carrier for movement across the table, a template adjusting member adapted to have a template secured thereto, said adjusting member being movable on the table in a direction at right angles to the direction of movement of the cutting tool carrier, and means arranged at opposite sides of the adjusting member and in the plane of movement of the cutting tool carrier permitting the cutting tool to penetrate the template and adapted to underlie the portions of the template lying laterally of the adjusting member and below the path of movement of the tool carrier.

5. A machine tool for producing templates comprising a template supporting table, a cutting tool carrier, means supporting said carrier for movement across the table, and a template adjusting member countersunk in the table lying substantially flush with the top of said table and adapted to have a template secured thereto, said adjusting member being movable on the table in a direction at right angles to the direction of movement of the cutting tool carrier and the major portion of the template being supported upon the table.

6. A machine tool for producing templates comprising a template supporting table, a cutting tool carrier, means for supporting said carrier for movement across the table, a template adjusting member adapted to have a template secured thereto, said adjusting member being countersunk in and lying substantially flush with the top of the table and movable therein in a direction at right angles to the direction of movement of the cutting tool carrier, and the major portion of the template being supported upon the table, and means arranged in the plane of movement of the cutting tool carrier and on opposite sides of the adjusting member permitting the cutting tool to penetrate the template.

7. A machine tool for producing templates comprising a table, a cutting tool carrier, means supporting said carrier for movement across the table and a relatively narrow bar mounted for sliding movement in said table at right angles to the direction of movement of the carrier, said bar lying substantially flush with the top of said table being adapted to have a template secured thereto and the major portions of the template being supported upon the table.

In testimony whereof I have signed my name to this specification.

WILLIAM ALFRED PEARN.